United States Patent [19]

Okuzawa

[11] Patent Number: 4,630,151

[45] Date of Patent: * Dec. 16, 1986

[54] FLEXIBLE MAGNETIC DISK DRIVING APPARATUS WITH LUBRICATED SURFACES

[75] Inventor: Yasutoshi Okuzawa, Odawara, Japan

[73] Assignee: Fuji Photo Film Co., Ltd., Kanagawa, Japan

[*] Notice: The portion of the term of this patent subsequent to Jun. 11, 2002 has been disclaimed.

[21] Appl. No.: 591,457

[22] Filed: Mar. 20, 1984

[30] Foreign Application Priority Data

Apr. 1, 1983 [JP] Japan ............................ 58-48721[U]

[51] Int. Cl.⁴ ...................... G11B 5/016; G11B 23/00; G11B 25/00
[52] U.S. Cl. ........................................ 360/99; 369/270
[58] Field of Search ................ 360/97, 99, 130.2, 133; 369/270

[56] References Cited

U.S. PATENT DOCUMENTS

| | | | |
|---|---|---|---|
| 4,354,213 | 10/1982 | Martinelli | 360/99 |
| 4,409,629 | 10/1983 | Puls | 360/99 |
| 4,485,464 | 11/1984 | Shimaoka | 360/97 |
| 4,499,996 | 1/1985 | Coyle | 360/99 |
| 4,523,246 | 6/1985 | Okuzawa | 360/133 |
| 4,544,977 | 10/1985 | Ozawa et al. | 360/99 |

Primary Examiner—Robert S. Tupper
Assistant Examiner—Melissa J. Kova
Attorney, Agent, or Firm—Gerald J. Ferguson, Jr.; James E. Bryan; Michael P. Hoffman

[57] ABSTRACT

An apparatus for driving a flexible magnetic disk comprises an upper member and a lower member for positioning a flexible magnetic disk sheet of the flexible magnetic disk by engagement with a circular hole at the center of the magnetic disk sheet. A lubricating material is applied onto the surfaces of the upper members and the lower members, thereby to decrease the coefficient of friction of the upper member with respect to the magnetic disk sheet to a value within the range of 0.45 or less, and that of the lower member to a value within the range of 0.30 or less.

6 Claims, 5 Drawing Figures

F I G. IA   F I G. IB
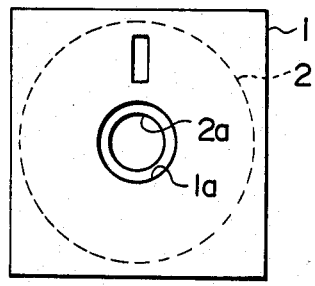
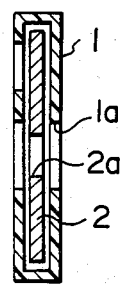
F I G. 2
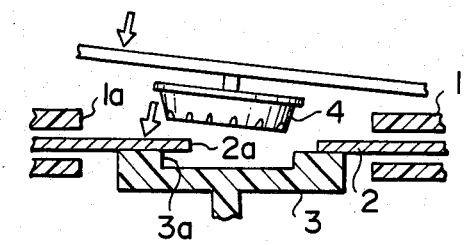
F I G. 3
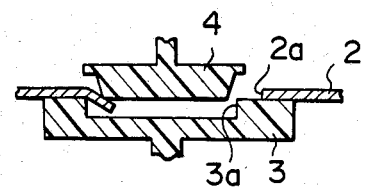
F I G. 4
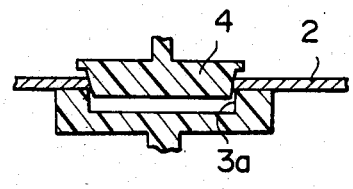

FLEXIBLE MAGNETIC DISK DRIVING APPARATUS WITH LUBRICATED SURFACES

BACKGROUND OF THE INVENTION

1. Field of the Invention

This invention relates to an apparatus for driving a flexible magnetic disk. This invention particularly relates to an improvement in positioning members comprising a collet, a rotatable section, or the like, for positioning a flexible magnetic disk in a flexible magnetic disk driving apparatus.

2. Description of the Prior Art

Conventionally, flexible magnetic disks comprising a jacket and a flexible magnetic disk housed therein are used for magnetic recording and reproducing. The jacket and the sheet have circular holes at the centers thereof for engagement with sheet positioning members of an information writing apparatus or an information read-out apparatus. Thus the sheet is rotated by a rotatable section of the sheet positioning members for magnetically recording information in the sheet or for magnetically reproducing information from the sheet. In the magnetic disk of this type, since the sheet is housed in the jacket in slightly spaced relation to the jacket, the position of the sheet sometimes deviates from the center of the jacket during storage, handling or carrying of the magnetic disk. When the magnetic disk is loaded into a writing apparatus or a read-out apparatus in this condition, the circular hole at the center of the sheet is positioned eccentrically with respect to the sheet positioning members (collet and rotatable section) of the apparatus. Thus the sheet is held in an eccentric position, and it becomes impossible to correctly write information into the sheet or to correctly read information out of the sheet.

FIG. 1A is a plan view showing an example of the flexible magnetic disk, and FIG. 1B is a sectional view of the flexible magnetic disk shown in FIG. 1A. The flexible magnetic disk comprises a rectangular jacket 1 having a circular aperture 1a in the center, and a flexible magnetic disk sheet 2 having a circular hole 2a in the center. The magnetic disk sheet 2 is rotatably housed in the jacket 1 so that the peripheral edge portion of the circular hole 2a of the magnetic disk sheet 2 is exposed within the circular aperture 1a of the jacket 1.

FIG. 2 is a partially sectional view showing the condition of loading the flexible magnetic disk between sheet positioning members in a writing apparatus or a read-out apparatus. FIG. 3 is a partially sectional view showing the condition of the flexible magnetic disk sheet of the flexible magnetic disk held in an eccentric position with respect to the sheet positioning members in a writing apparatus or a read-out apparatus. FIG. 4 is a partially sectional view showing the condition of the flexible magnetic disk sheet of the flexible magnetic disk correctly positioned by the sheet positioning members in a writing apparatus or a read-out apparatus.

As shown in FIG. 2, when the aforesaid flexible magnetic disk is loaded into a writing apparatus or a read-out apparatus, a rotatable section 3 of the sheet positioning members is contacted with the magnetic disk sheet 2 from below, and a collet 4 of the sheet positioning members is moved down and fitted into a circular recess 3a of the rotatable section 3. However, the peripheral edge portion of the circular hole 2a of the sheet 2 is not always aligned with the peripheral edge portion of the circular recess 3a of the rotatable section 3, but instead often deviates from the peripheral edge portion of the circular recess 3a. As shown in FIG. 3, when the collet 4 is moved down in this condition, a part of the peripheral edge portion of the circular hole 2a of the sheet 2 is sandwiched between the collet 4 and the peripheral edge portion of the circular recess 3a of the rotatable section 3. As a result, the sheet 2 is held eccentrically with respect to the rotatable section 3 and the collet 4, and rotated in this condition in the writing apparatus or in the read-out apparatus. Such positioning of the sheet 2 must be avoided since writing of information into the sheet 2 and read-out of information therefrom are not conducted correctly unless the sheet 2 is rotated with the center thereof exactly aligned with the rotation axis. Further, when the sheet 2 is rotated in the eccentrically held condition, flatness of the sheet 2 is adversely affected, and the sheet 2 is subject to flapping motion during rotation. In order that the sheet 2 be correctly positioned on the peripheral edge portion of the circular recess 3a, as shown in FIG. 4, as the collet 4 is moved down, it is desired that the coefficient of friction of the rotatable section 3 and the collet 4 with respect to the sheet 2 be low.

SUMMARY OF THE INVENTION

The primary object of the present invention is to provide an apparatus for driving a flexible magnetic disk, into which a flexible magnetic disk sheet of the flexible magnetic disk is loaded in a correct position.

Another object of the present invention is to provide an apparatus for driving a flexible magnetic disk, which comprises sheet positioning members exhibiting a low coefficient of friction with respect to the flexible magnetic disk sheet of the flexible magnetic disk.

The apparatus for driving a flexible magnetic disk in accordance with the present invention comprises an upper positioning member and a lower positioning member for positioning the flexible magnetic disk sheet of the flexible magnetic disk by engagement with a circular hole at the center of said flexible magnetic disk sheet, wherein the improvement comprises applying a lubricating material to the surfaces of said upper positioning member and said lower positioning member, thereby decreasing the coefficient of friction of said surfaces with respect to said flexible magnetic disk sheet.

In the present invention, since the upper positioning member and the lower positioning member exhibit a low coefficient of friction with respect to the flexible magnetic disk sheet, the sheet can be smoothly loaded in a correct position of the flexible magnetic disk driving apparatus by the upper positioning member and the lower positioning member.

BRIEF DESCRIPTION OF THE DRAWINGS

FIG. 1A is a plan view showing an example of the flexible magnetic disk,

FIG. 1B is a sectional view showing the flexible magnetic disk of FIG. 1A,

FIG. 2 is a partially sectional view showing the condition of loading the flexible magnetic disk between sheet positioning members in an information writing apparatus or an information read-out apparatus, FIG. 3 is a partially sectional view showing the condition of the flexible magnetic disk sheet of the flexible magnetic disk held in an eccentric position with respect to the sheet positioning members in an information writing apparatus or an information read-out apparatus, and FIG. 4 is a partially sectional view showing the condition of the flexible magnetic disk sheet of the flexible magnetic disk correctly positioned by the sheet positioning members in an information writing apparatus or an information read-out apparatus.

DETAILED DESCRIPTION OF THE INVENTION

By the application of the lubricating material to the surfaces of the upper positioning member and the lower positioning member, the coefficient of friction of the upper positioning member with respect to the flexible magnetic disk sheet should preferably be decreased to 0.45 or less, and the coefficient of friction of the lower positioning member with respect to the sheet should preferably be decreased to 0.30 or less. For this purpose, it is advantageous to apply, for example, a Teflon coat to the surfaces of the upper positioning member and the lower positioning member. Teflon is a registered trademark for polytetrafluoroethylene. By the application of a Teflon coat, the coefficient of friction of the upper positioning member with respect to the flexible magnetic disk sheet is decreased from 0.6 (value for the upper positioning member without the Teflon coat) to a value within the range of 0.45 or less. The coefficient of friction of the lower positioning member is thereby decreased from 0.4 to a value within the range of 0.30 or less. In this case, the flexible magnetic disk sheet is pushed by the slant surface of the upper positioning member (i.e. the aforesaid collet) and smoothly moved from an eccentric position to the concentric position with respect to the positioning members, as the collet is moved down from above the sheet for positioning the sheet in the flexible magnetic disk driving apparatus. Thus the sheet can be correctly positioned in the apparatus.

EXAMPLE

A $3\mu$-thick Teflon coat was applied onto the surface (specifically, the surface of the collet portion which comes into contact with the peripheral edge portion of a circular hole at the center of a flexible magnetic disk sheet) of a collet used as the upper positioning member in a Model M-4853 magnetic disk deck produced Mitsubishi Electric Co., Ltd. Also, a $3\mu$-thick Teflon coat was applied to the surface of a rotatable section used as the lower positioning member of the magnetic disk deck. By the application of the Teflon coats, the coefficient of friction of the upper positioning member with respect to the disk sheet was decreased from 0.6 to 0.45, and the coefficient of friction of the lower positioning member was decreased from 0.4 to 0.30.

Loading tests were conducted by use of the aforesaid magnetic disk deck. First, the loading test was repeated four times without applying the Teflon coats to the upper positioning member and the lower positioning member. In all of the four tests, the disk sheets failed to be correctly loaded by the positioning members into the magnetic disk deck, but instead were positioned eccentrically with respect to the positioning members. When the Teflon coats were applied to the positioning members and the loading test was repeated four times, the disk sheets were correctly loaded by the positioning members into the magnetic disk deck.

The loading tests were also conducted by applying the Teflon coats to the positioning members so that the coefficient of friction of the upper positioning member with respect to the disk sheet was 0.35 and the coefficient of friction of the lower positioning member was 0.25. In these loading tests, good results were obtained.

Further, the loading tests were conducted ten times with the coefficient of friction of the upper positioning member with respect to the disk sheet adjusted to 0.50, and that of the lower positioning member adjusted to 0.35. In this case, a sheet loading error occurred in four of the ten tests. When the loading tests were conducted ten times with the coefficient of friction of the upper positioning member with respect to the disk sheet adjusted to 0.50, and that of the lower positioning member adjusted to 0.30, a sheet loading error occurred in two of the ten tests. On the other hand, when the loading tests were conducted ten times with the coefficient of friction of the upper positioning member with respect to the disk sheet adjusted to 0.45, and that of the lower positioning member adjusted to 0.30, no loading error arose in ten tests. From the test results as described above, it was found that the coefficient of friction of the upper member with respect to the disk sheet should be within the range of 0.45 or less, and the coefficient of friction of the lower positioning member should be within the range of 0.30 or less. In the above-described tests, the coefficient of friction was measured at a feed rate of the positioning members and the disk sheet of 0.8 mm/second, an applied load of 70 gram-weight, an ambient temperature of 23° C., and relative humidity of 70%.

I claim:

1. An apparatus for driving a flexible magnetic disk, comprising an upper positioning member and a lower positioning member for positioning a flexible magnetic disk sheet of the flexible magnetic disk by engagement with a circular hole at the center of said flexible magnetic disk sheet, wherein the improvemeht comprises a Teflon coating applied to surfaces of said upper positioning member and said lower positioning member, thereby decreasing coefficients of friction of said surfaces with respect to said flexible magnetic disk sheet, Teflon is a registered trademark for polytetraflouroethylene.

2. An apparatus as defined in claim 1 wherein the coefficient of friction of said upper positioning member with respect to said flexible magnetic disk sheet is within the range of 0.45 or less, and the coefficient of friction of said lower positioning member with respect to said flexible magnetic disk sheet is within the range of 0.30 or less.

3. An apparatus as defined in claim 1 wherein the thickness of said Teflon coat is about $3\mu$.

4. An apparatus as defined in claim 1 wherein said upper positioning member is a collet having a slant surface, and said Teflon coating is applied onto the collet surface which comes into contact with a peripheral edge portion of said circular hole of said flexible magnetic disk sheet.

5. An apparatus as defined in claim 1 wherein said lower positioning member is a rotatable member having a circular recess for engagement with said upper positioning member.

6. An apparatus as defined in Claim 5 wherein said Teflon coating is applied onto a peripheral edge portion of said circular recess which comes into contact with a peripheral edge portion of said circular hole of said flexible magnetic disk sheet.

* * * * *